United States Patent [19]
Patrick et al.

[11] Patent Number: 5,717,845
[45] Date of Patent: Feb. 10, 1998

[54] METHOD AND APPARATUS FOR TRANSFERRING A BRUSH PATTERN TO A DESTINATION BITMAP

[75] Inventors: Stuart Raymond Patrick, Issaquah; Amit Chatterjee, Redmond, both of Wash.

[73] Assignee: Microsoft Corporation, Redmond, Wash.

[21] Appl. No.: 355,395

[22] Filed: Dec. 13, 1994

[51] Int. Cl.$^6$ ................................................. G06F 15/00
[52] U.S. Cl. ................................................. 395/138
[58] Field of Search ........................ 395/138, 139, 395/136; 345/121, 127, 147

[56] References Cited

U.S. PATENT DOCUMENTS 5,548,706  8/1996  Koizumi et al. ................... 395/139

OTHER PUBLICATIONS

"Device Driver Adaptation Guide" Microsoft Corporation, 1992; Chapters 1, 2 & 10.

*Primary Examiner*—Phu K. Nguyen
*Attorney, Agent, or Firm*—Klarquist Sparkman Campbell Leigh & Whinston, LLP

[57] ABSTRACT

Method and apparatus for transferring a brush pattern of pixels stored in memory to a destination bitmap in memory. The method transfers an entire row of the brush pattern to the scan line of a destination bitmap without checking each byte for the end of the row. Data bytes are fetched from the pixel row a predetermined number of times to transfer the pixel row in one pass. The transfer method preferably uses multiple-byte words on word-aligned boundaries of memory to reduce the number of fetches and writes and the number of memory cycles to execute the transfer. The transfer may include combining the pattern with a bitmap such as a source bitmap or the destination bitmap and transferring the combination to the destination bitmap. To accelerate the transfer process, a compiler is provided to compile, in response to an appropriate function call, run time code that is then immediately executed to transfer the pattern to the destination bitmap.

38 Claims, 7 Drawing Sheets

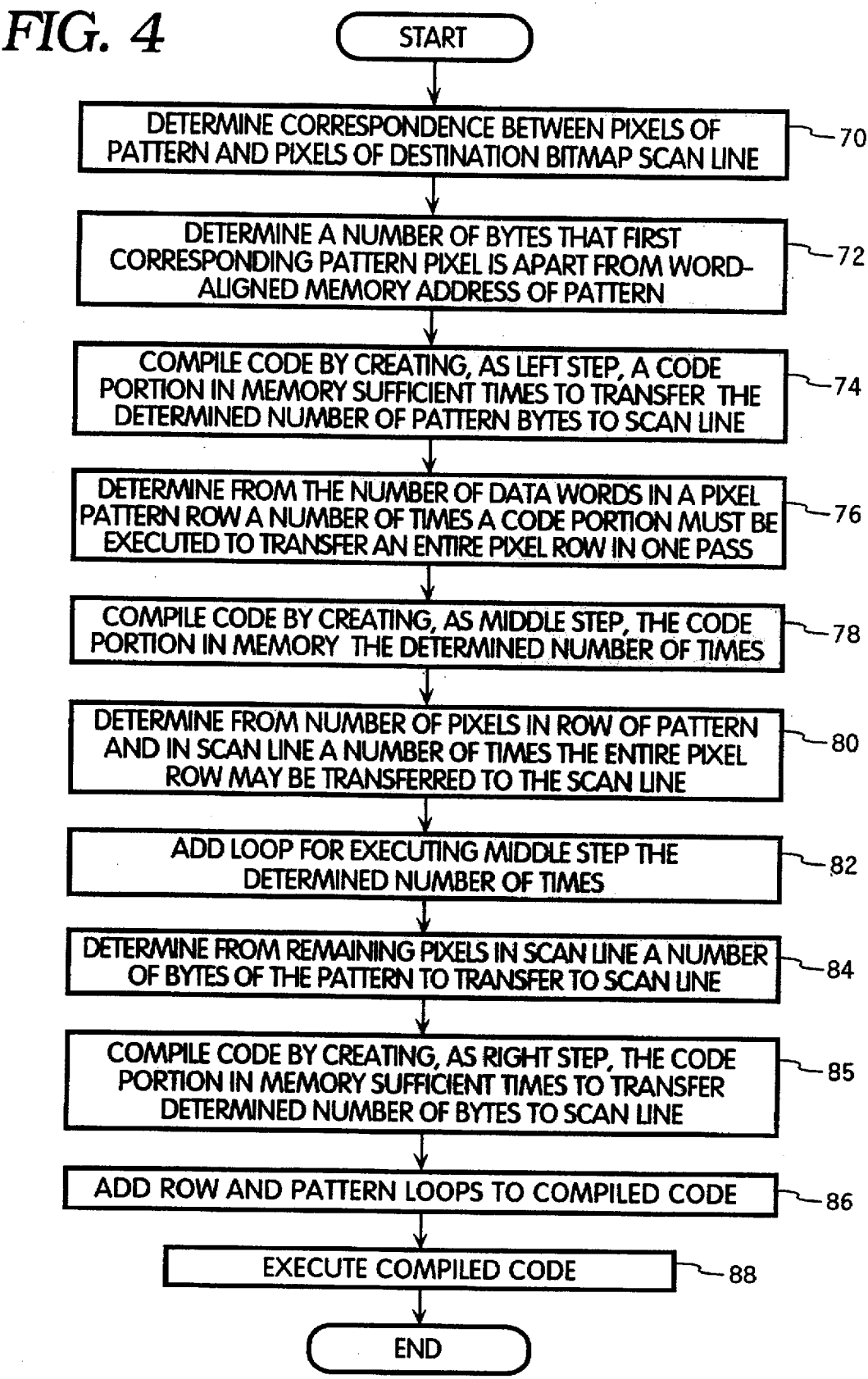

METHOD AND APPARATUS FOR TRANSFERRING A BRUSH PATTERN TO A DESTINATION BITMAP

FIELD OF THE INVENTION

This invention relates generally to computer graphics. More particularly, this invention relates to a method and apparatus for transferring a pattern stored in memory to a destination bitmap. The pattern may be combined with a bitmap as part of the transfer. The combining and transfer are rapidly performed with multiple-byte groups, or words, of data to transfer an entire row of the pattern in minimum time.

BACKGROUND OF THE INVENTION

In the field of computer graphics, pictorial information is often stored as a bitmap, in which each pixel of an image corresponds to 1 or more bits in the bitmap. Monochrome bitmaps require only 1 bit per pixel (or "bpp"); color bitmaps require additional bits to indicate the color of each pixel. Typically, color pixels are represented by 8, 16, or 24 bits per pixel.

Often all or part of a bitmap must be moved from one location in a computer's memory (the "source" location) to another location (the "destination" location). Transfers of this type are called bitmap block transfers, or "blt"s for short, and are typically carried out by a computer's operating system in response to a function call from an application program. For example, an application program may have "drawn" a figure on a bitmap in a source memory location by changing the numeric values of the bits in the bitmap. To display the figure rapidly on the screen of a display device, the bitmap is block transferred (or "blitted") from the source memory location to the video display (destination) memory location. A display device associated with the video display memory then displays the bitmap containing the figure. The video display memory is also commonly referred to as the screen memory, or frame buffer, for the display device.

Graphical operating systems such as Windows 3.1 from Microsoft Corporation of Redmond, Wash., contain blt functions that permit a pattern known as a brush to be transferred to destination bitmap. As part of that transfer, the pattern may be combined in a number of ways with a bitmap and the combination transferred to the destination bitmap. The bitmap may be the destination bitmap or a separate source bitmap. The pattern is typically a square of pixels arranged in rows which is used for background fill in windows on a display screen. The brush pattern may be combined with bitmaps through raster operation codes, or ROPs, that are parameters in blt function calls. For example, a pattern blt function outputs a brush pattern to a destination bitmap. The brush pattern may be copied to the destination bitmap, thereby replacing data previously stored there, or may be combined with the destination bitmap in other ways, depending on the raster operation code specified in the function call. A bitblt function combines a source bitmap with the brush pattern and destination bitmap, the particular combination again depending on the ROP specified in the function call. For example, a common bitblt operation is to simply copy the source bitmap to the destination bitmap as described above. However, other operations are possible, such as combining the brush pattern with the source bitmap and transferring the result to the destination bitmap, combining the brush pattern with the destination bitmap, etc.

The transfer of a brush pattern to the destination bitmap should be as fast as possible, since this operation occurs frequently and involves the movement of large amounts of data. For example, in the process of opening different windows on a display, data blocks from source bitmaps and the brush pattern are transferred into the display memory to produce the windows' colors, text and graphics. Therefore, the slower the rate of transfer, the slower the rate at which the computer system operates.

Prior approaches for transferring the brush pattern to a destination bitmap have been slow and inefficient. The difficulty lies in the nature of the brush. It is typically a rectangular pattern of pixels such as 8 by 8 (numbered 0 through 7), that is "tiled" on a destination, such as the computer's display memory. By tiling is meant that the pattern is aligned with the first pixel of the display memory and repeats across the display memory every 8 pixels. The destination bitmap, on the other hand, may be anywhere within the display memory. First it must be determined which pixels of the repeating brush pattern correspond to the pixels of the destination bitmap. For example, the destination bitmap may begin at pixel location row 100, column 255 in the display memory. By dividing these two numbers by 8, the corresponding pixel in the pattern is calculated from the remainders, i.e., row 4, column 7. For each line of the destination bitmap, the corresponding pixels of the pattern are then fetched, beginning with pixel 7, then continuing with pixel 0, pixel 1, etc. of the fourth row and combined with destination bitmap pixels according to the ROP.

Moving from the last pixel in a row of the pattern back to the first pixel is known as "wrapping around" the brush. The inefficiency of prior approaches stems from their wrapping techniques, in which each pixel of the pattern must be tested after processing to determine if it is the last pixel of a row. If it is the last pixel, the wrapping technique then jumps to another memory location where the first pixel of the row is available for processing. If it is not the last pixel, the next byte in memory represents the next pixel in the row. Because data block transfers typically involve thousands of bytes, this need to test each pixel of the pattern results in a slow transfer. For a thousand byte block transfer (with one byte per pixel), for example, the wrapping test must be executed a thousand times.

Accordingly, an object of the invention is to transfer a pattern to a destination bitmap more rapidly than before by processing a pixel row of the pattern without checking the bytes of each pixel to determine if the pixel is the last pixel of the pattern row. Another object of the invention is to reduce the time required for transferring the pattern to a destination bitmap by transferring the pattern in multiple-byte words at word-aligned memory addresses of a particular computer system. Still another object of the invention is to transfer a pattern to a destination bitmap rapidly through the generation of run time code, preferably with the code adapted for transferring the data efficiently in multiple-byte words.

SUMMARY OF THE INVENTION

In accordance with the invention, a method and apparatus for transferring a brush pattern of pixels stored in memory to a destination bitmap stored in memory is shown and described. In its basic form, the method includes determining which pixels of the pattern correspond to pixels of the destination bitmap. A number of data bytes contained within a pixel row of the pattern is also determined. The pixels of the pattern are then transferred as a row to the destination bitmap by performing the following steps. From a corresponding pattern pixel memory address, data bytes are fetched from the pattern row a predetermined number of times. The number of times is determined by the number of bytes within a row, so that an entire row is fetched as a result. The fetched data bytes are then transferred to memory addresses of corresponding destination bitmap pixels. As part of transferring the pixel row, the fetched data bytes may be combined with data bytes of a bitmap, and the combination may be transferred to the destination bitmap. The bitmap that is combined with the pattern may be the destination bitmap or a separate bitmap.

To accelerate the transfer process, the data bytes may be fetched in multiple-byte words. The predetermined number of times bytes are fetched from the pattern row is then determined by the number of multiple-byte words within a pixel row. For example, if the data bytes may be fetched in 4-byte words, then a pixel row of 8 pixels each represented by 1 byte may be efficiently transferred in two fetches. The process may be further accelerated by fetching bytes in multiple-byte words on word-aligned memory addresses because at least some computer systems transfer bytes more rapidly when memory is accessed on word-aligned locations. Continuing the above example, if word-aligned memory addresses are addresses divisible by 4, then 4-byte words stored at word-aligned memory addresses are most rapidly transferred.

The method may be further applied to transfer a pixel row to a scan line of a destination bitmap and to transfer a next pixel row to a next scan line of the destination bitmap. Patterns have a predetermined number of rows, and the method may include repeatedly transferring a first row of the pattern following a transfer of a last row of the pattern.

In some circumstances such as the above example, the bytes representing a first pixel of the pattern that corresponds to a destination bitmap pixel may not be stored at a word-aligned memory address. In such a case, a number of bytes that the first pattern pixel is apart from a word-aligned address are first fetched and transferred to a memory address of a corresponding destination bitmap pixel. The next bytes of the pattern are at a word-aligned memory address, and these bytes may then be fetched as data words from successive word-aligned addresses of the pattern and transferred to the destination bitmap.

In the preferred embodiment, the method may be implemented as part of a run time compiler that compiles code to transfer the pattern to the destination bitmap in response to a function call.

Apparatus for practicing the method may include a programmed computer system, dedicated hardware devices and equivalent devices.

The foregoing and other objects, features, and advantages of the invention will become more apparent from the following detailed description of a preferred embodiment and the accompanying drawings.

BRIEF DESCRIPTION OF THE DRAWINGS

FIG. 4 is a flowchart of a method embodying the invention for compiling run time executable code to transfer a brush pattern to a destination bitmap.

DETAILED DESCRIPTION OF A PREFERRED EMBODIMENT

Figure 1:
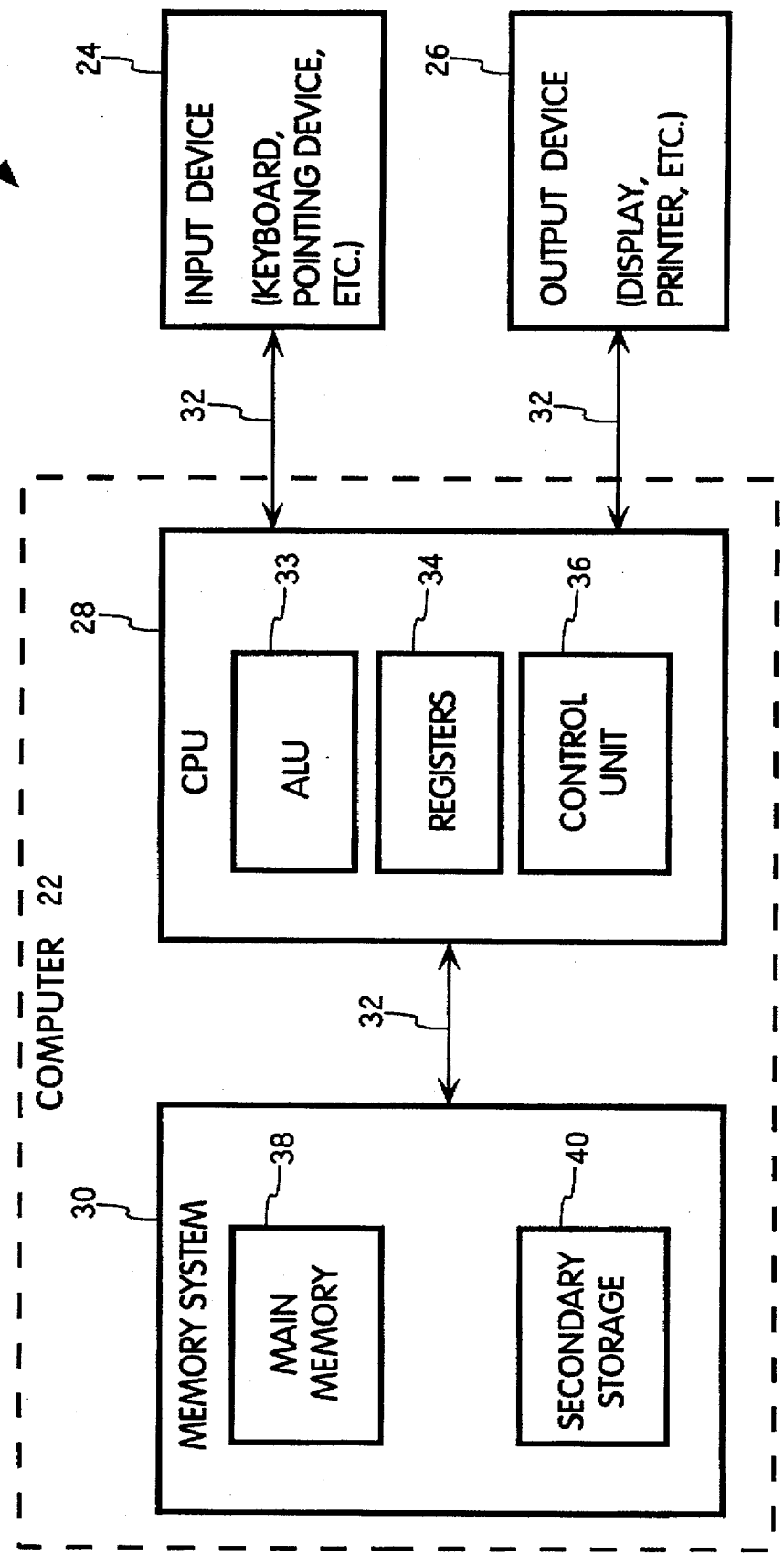
FIG. 1 is a block diagram of a computer system that may be used to implement a method and apparatus embodying the invention.

FIG. 1 is a block diagram of a computer system 20 which is used to implement a method and apparatus embodying the invention. Computer system 20 includes as its basic elements a computer 22, input device 24 and output device 26.

Computer 22 generally includes a central processing unit (CPU) 28 and a memory system 30 that communicate through a bus structure 32. CPU 28 includes an arithmetic logic unit (ALU) 33 for performing computations, registers 34 for temporary storage of data and instructions and a control unit 36 for controlling the operation of computer system 20 in response to instructions from a computer program such as an application or an operating system.

Memory system 30 generally includes high-speed main memory 38 in the form of a medium such as random access memory (RAM) and read only memory (ROM) semiconductor devices and secondary storage 40 in the form of a medium such as floppy disks, hard disks, tape, CD-ROM, etc. and other devices that use optical or magnetic recording material. Main memory 38 stores programs such as a computer's operating system and currently running application programs. Main memory 38 also includes video display memory for displaying images through a display device.

Input device 24 and output device 26 are typically peripheral devices connected by bus structure 32 to computer 22. Input device 24 may be a keyboard, modem, pointing device, pen, or other device for providing input data to the computer. Output device 26 may be a display device, printer, sound device or other device for providing output data from the computer.

It should be understood that FIG. 1 is a block diagram illustrating the basic elements of a computer system 20; the figure is not intended to illustrate a specific architecture for a computer system 20. For example, no particular bus structure is shown because various bus structures known in the field of computer design may be used to interconnect the elements of the computer system in a number of ways, as desired. CPU 28 may be comprised of a discrete ALU 33, registers 34 and control unit 36 or may be a single device in which these parts of the CPU are integrated together, such as in a microprocessor. Moreover, the number and arrangement of the elements of the computer system may be varied from what is shown and described in ways known in the art (i.e., multiple CPUs, client-server systems, computer networking, etc.).

Figure 2:
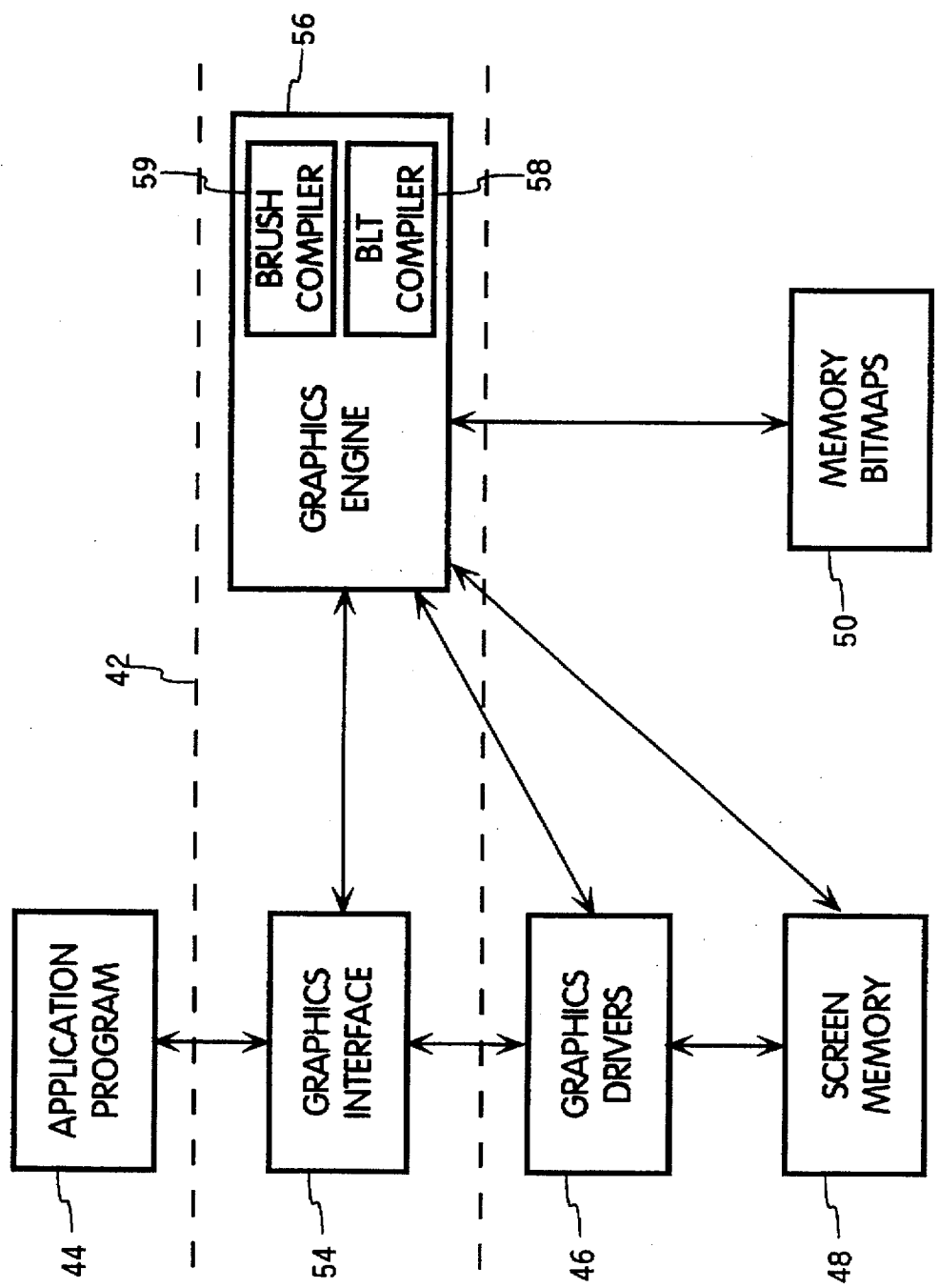
FIG. 2 is a block diagram of an application program, operating system including a brush compiler, graphics drivers and memory within a computer system such as shown in FIG. 1.

FIG. 2 is a block diagram of a portion of an operating system 42 in communication with an application program 44 and a graphics driver 46. Operating system 42 further communicates with screen memory 48 and memory bitmaps 50 or other memory locations that may serve as sources and destinations in memory for a data block of bytes. Within the illustrated portion of operating system 42 are a graphics interface 54 and a graphics engine 56. Each of the blocks in FIG. 2 except for the memory is typically implemented as a module of code stored in memory for executing a set of related functions.

In the process of transferring a data block from a source to a destination in memory, application program 44 calls a blt function in graphics interface 54, passing as parameters the location of the source and destination, the size in pixels of the data block to be transferred and a raster operation code (ROP) for logically combining the bits in the source and destination. Graphics interface 54, in turn, calls an appropriate function in graphics driver 46 which, in turn, calls an appropriate function in a graphics engine 56. Graphics engine 56 contains, among other things, a blt compiler 58 for compiling run time code for carrying out the transfer efficiently. A preferred embodiment of blt compiler 58 is shown and described in U.S. patent application Ser. No. 08/356, 062, filed Dec. 13, 1994, which is hereby incorporated by reference. Using compiler 58 in response to a call to a blt function, graphics engine 56 carries out the data block transfer from the source to the destination in memory and notifies graphics interface 54 to this effect. In the preferred embodiment of the present invention, a brush compiler 59, to be described, is included within the graphics engine 56 for transferring a brush pattern to a destination bitmap in accordance with the invention. The brush compiler may be a separately stored code in main memory 38 or may be an enhancement to the blt compiler 58 for data block transfers that involve the brush pattern.

This, of course, is only a description of the preferred embodiment. The brush compiler 59 may also be contained in the graphics interface, graphics drivers, an application program or suitably elsewhere in computer system 20. Moreover, the method and apparatus of the invention to be described are not limited to use in a compiler, but may be implemented independently as a stored routine, as a hardware device or in other ways as well.

The present embodiment employs brush compiler 59 for rapidly transferring a brush pattern row by row to a destination bitmap in memory. The rate of transfer is increased by transferring the pattern data bytes in groups of multiple bytes where possible, such as in 2- or 4-byte groups. The byte size of the groups that may be rapidly transferred is a function of the architecture of CPU 28 and memory 38 and varies among different computer systems. In the Intel Corporation family of microprocessors which is used in the preferred embodiment, the more advanced microprocessors are designed to transfer information between memory and microprocessor registers such as EAX, EBX, etc., in addressable data items of a single byte, 2 bytes, and 4 bytes. Two-byte addressable data items in Intel microprocessors are referred to as words and 4-byte addressable data items are referred to as double words. However, for the purpose of description, the term "word" is broad enough to encompass double words. "Word" should be understood to refer to a group of 2 or more bytes (i.e., 2, 4, 8, etc.) that may be read from or written to memory as a single addressable data item. The terms "word-aligned address" and "word-addressable boundary" are used interchangeably to refer to a memory address to which a word may be written or from which a word may be fetched in a single memory cycle.

The advantage of handling a word of multiple bytes as a single addressable data item is speed of transfer. Transferring 4 bytes by executing an instruction once may be up to 4 times as fast as transferring 4 bytes by executing an instruction 4 times. However, a word of bytes may not always be efficiently transferrable as a single data item. In the Intel 80486 microprocessor, for example, 4 bytes can be transferred as a double word to and from memory through a 32-bit register with a single memory cycle only if the memory reference is "aligned" with a 4-byte word boundary, defined as a memory address divisible by 4. Because of the way the hardware memory interface works in Intel architecture, a 32-bit operand must begin at a 4-byte word boundary, or the operand will require 2 memory cycles to read the operand. The same data transfer efficiency is true for word transfer on a 2-byte word boundary (memory address divisible by 2) and double and extended precision floating-point number transfer on memory addresses divisible by 8. Further information on this topic may be found in a number of references, including "Microsoft's 80386/80486 Programming Guide," 1991, available from Microsoft Press.

Before proceeding with a description of the preferred embodiment, the following overview is provided to explain what is involved in transferring a brush pattern to a destination bitmap in screen memory 48.

Figure 3:
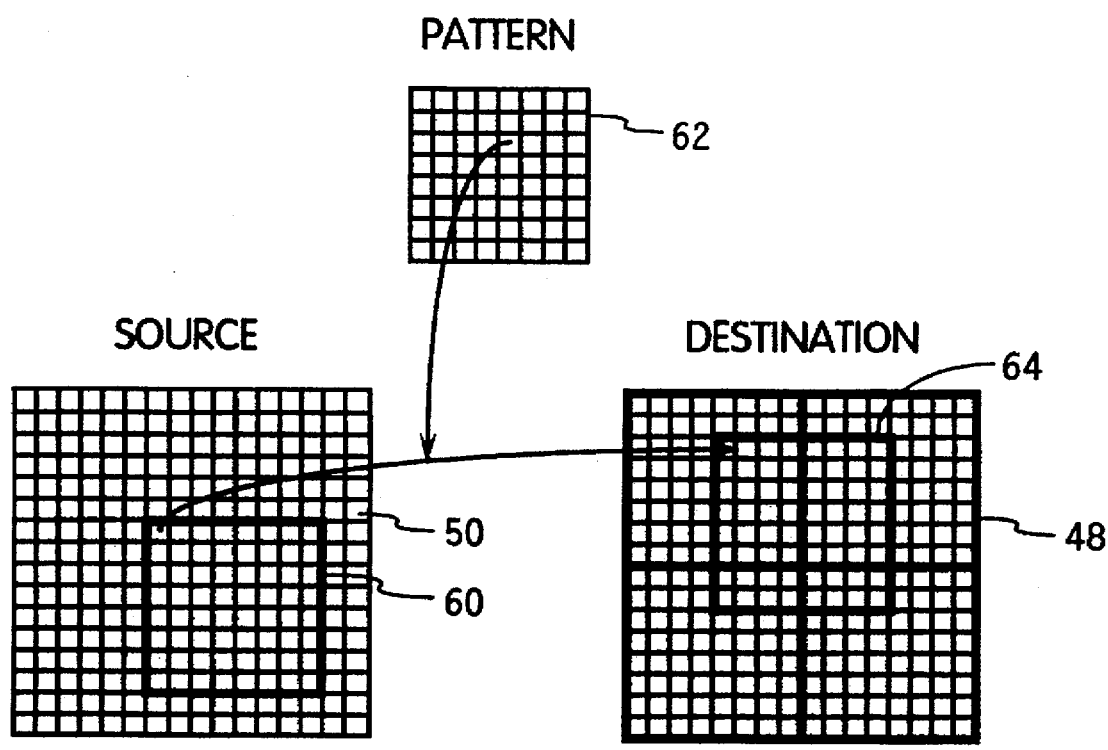
FIG. 3 is a pictorial diagram showing generally a process embodying the invention for transferring a brush pattern to a destination bitmap in memory.

FIG. 3 shows a source bitmap 60 within a memory bitmap 50, a brush pattern 62 and a destination bitmap 64 within screen memory 48. Brush pattern 62 is also a bitmap of pixels that may be stored within main memory 38. The brush pattern may be transferred directly to the destination bitmap or may be combined with the source or destination bitmap according to a ROP and stored at bitmap 64 within screen memory 48. The source bitmap may be the destination bitmap in many ROPs. The size and location of the source and destination bitmaps may be specified by coordinates. The source bitmap 60, brush pattern 62 and destination bitmap 64 each has a number of bits per pixel (bpp) such as 8. The number of bits per pixel for each of these bitmaps may initially vary depending upon the color depth of the bitmap when it was formed, but each is converted to the same depth prior to a block transfer using well known conversion techniques.

In graphics operating systems such as Windows 3.1, the screen memory 48 is recognized as a device context, and the brush pattern 62 is associated with the screen memory 48 as a device object. This association produces the "tiling" of the brush to the screen memory 48 shown in FIG. 3, wherein the brush pattern is shown repeated four times within the screen memory to indicate which pixels of the pattern correspond with pixels of the destination bitmap.

The correspondence between pixels of brush pattern 62 and pixels of the destination bitmap 64 is computed by x mod 8 and y mod 8 (the correspondence being the remainder of x after division by 8). The variable x is a screen memory row coordinate and y is a screen memory column coordinate of a pixel in the destination bitmap, and 8 is the number of pixels in each row of the pattern. For example, if the lower right hand corner pixel of the destination bitmap 64 has the screen memory coordinates (10, 12), then the corresponding pattern pixel from brush pattern 62 is (2, 4).

In executing various blt functions, the pixels of the destination bitmap 64 or source bitmap 60 may be combined with the corresponding pixels of brush pattern 62. The particular combination is specified by a ROP code that is passed in a function call as an argument to the function. One ROP code, for example, copies the source bitmap 60 to the destination bitmap 64 without involving the brush pattern 62. Another ROP code copies the brush pattern 62 to the destination bitmap 64 without involving the source bitmap 60 or destination bitmap. Other ROP codes perform logical combinations such as ANDing and ORing the brush pattern with the source or destination bitmaps.

Figure 5A:
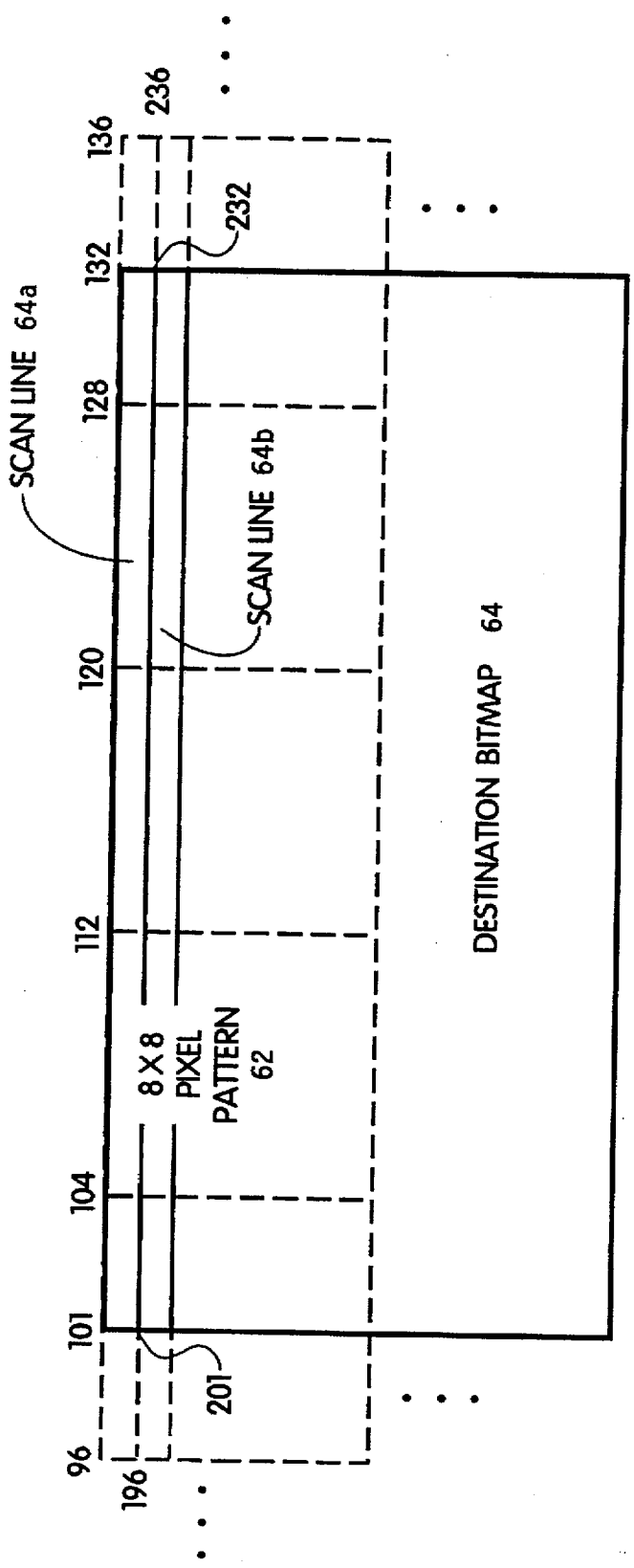
FIGS. 5A, 5B are pictorial diagrams showing particularly a process embodying the invention for transferring a pixel row of a pattern to a scan line of a destination bitmap.

FIG. 4 is a flowchart of the steps followed by brush compiler 59 in generating code that transfers a pattern, row by row, to a destination bitmap. It should be understood that the steps shown therein are not required to be taken in the illustrated order and that additional steps may be added for performing various raster operations. FIGS. 5A, B show an example of a pattern to be transferred to a destination bitmap. For aid in understanding how the compiler works, Appendix A provides a listing of sample code that may be generated by compiler 59 for the example of FIGS. 5A, B.

Referring to FIG. 4, before compiler 59 can generate the necessary code, a correspondence between pixels of pattern 62 and pixels of a scan line of destination bitmap 64 is determined (70). FIG. 5A is an example illustrating this step. Pattern 62, which, in this example, has one byte per pixel, eight pixels per row, and eight rows per pattern, is shown tiled across several scan lines of destination bitmap 64, repeating on memory addresses that are multiples of eight such as 96, 104, 112, etc. The first scan line 64a of the destination bitmap, which also has one byte per pixel, occupies memory locations 101–132, the second scan line occupies memory locations 201–232, etc. FIG. 5A shows that the first pixel of destination bitmap scan line 64a, at memory location 101, corresponds to the fifth pixel in the first row of pattern 62. The second pixel of scan line 64a corresponds with the sixth pixel of the first row, and so forth.

Figure 5B:
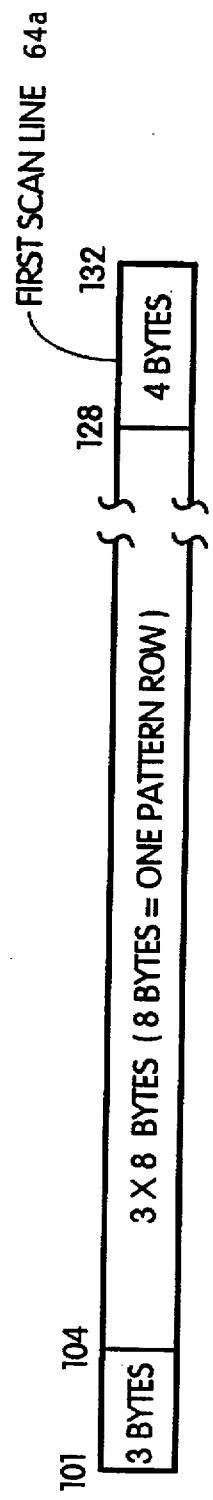

Compiler 59 determines the number of bytes that the first corresponding pattern pixel is apart from a word-aligned memory address of the pattern (72). In the example of FIG. 5A, a word is four bytes and the word-aligned memory addresses of the pattern are thus the zeroth address and the fourth address. The first corresponding pixel is the fifth pixel of the pattern row, three bytes away from the next zeroth memory address (because the pattern repeats every 8 bytes). This is illustrated in FIG. 5B where the first pattern pixel corresponds to memory location 101 in destination bitmap 64, five locations away from memory location 96.

Compiler 59 generates the required transfer code portion and copies it to a memory buffer in main memory 38 a sufficient number of times to transfer the determined number of bytes to the destination bitmap scan line 64a in a single pass (74). In the present embodiment, the generated code includes a number of other instructions that manipulate data in various registers. This is known as the "Left Step" of the transfer process because, in viewing FIG. 5A, the process covers the left part of scan line 64a from memory location 101 up to aligned memory location 104. The number of times the transfer code (i.e., mov instruction) is copied depends on the architecture of the central processing unit 28. In Intel microprocessors, bytes fewer than four may be handled singly or in pairs. Therefore, the transfer code is preferably copied twice and the operands chosen accordingly for processing one byte and two bytes, respectively. Appendix A therefore contains two copies of the transfer code in the listing for the Left Step code, where ESP is a pointer to the beginning address of the pixel row of the pattern and offsets are added to access the desired pixels of the row. The use of the transfer code twice is preferred over a loop because the twice-copied code executes faster in one pass than the use of a loop to pass through the code several times. The additional memory required is negligible. However, a loop may be used if desired.

A determination is also made from the number of data words contained in a pixel pattern row of a predetermined number of times the transfer code must be executed to fetch and transfer an entire row in one pass through the routine (76). The determination may alternatively be made of the number of bytes (rather than words) in a pixel pattern row, if multiple-byte word transfers are not critical. In the example of FIG. 5A, the pattern has 8 bytes to a row and the transfer code can efficiently transfer a 4-byte word in a single instruction. Therefore the transfer code must execute twice to transfer a pixel pattern row, such as to memory locations 112–117 of scan line 64a. The transfer code is generated twice with appropriate offsets to the pattern pointer ESP to combine first one and then the other portion of the row (78). This is the Middle Step shown in Appendix A. Each pass through the code of the Middle Step therefore handles an entire pixel row of pattern 62. In contrast to the prior art approach, there is no need to test the bytes of each pixel to determine if the pixel is the last pixel of the pixel row because the predetermined number of fetches assures that exactly one row is transferred per pass. This transfer code is added to the previously compiled code stored in the memory buffer.

A determination is further made of the number of times the entire pixel row may be transferred to the destination bitmap scan line (80), starting from a word-aligned memory address. For example, in the magnified view of FIG. 5B, it is seen that the scan line 64a is long enough that the first row of pattern 62 is transferred to scan line 64a three times. The compiler 59 then adds a loop to the compiled code for executing the Middle Step code the determined three number of times (82). In this case, a loop is used because the Middle Step code is much greater in length than the Left Step code. However, the loop need not be used if desired.

Right Step code is also compiled in the same manner as the Left Step code. The compiler 59 determines from the remaining pixels in the destination bitmap scan line a number of bytes of the pattern to transfer to the scan line (84). In the example of FIGS. 5A and 5B, 4 bytes in memory locations 128–131 remain in scan line 64a. Compiler 59 then creates transfer code with operands for moving 4 bytes in each instruction, adjusts the appropriate pointers, and adds the code to the compiled code in the memory buffer (85). The result appears in the Right Step shown in Appendix A.

For other scan lines in a destination bitmap such as scan line 64b in FIG. 5A, another row of pattern 62 is involved. And every eight scan lines, the pattern repeats since it has only 8 rows. To account for these changes, row and pattern loops are added to the compiled code (86). Appendix A include the appropriate code where the pattern is an 8-by-8 pixel pattern with one byte per pixel. A row increment is done by adding 8 to the pattern pointer ESP. To return to the first row from the seventh pattern row, ESP is ANDed with a mask of value 11111111. The mask does not affect ESP until ESP is 100000000, indicating that the end of the 64-byte pattern has been reached. ESP is reset to 0, and the transfer process begins again with the first pixel row of the pattern.

Once the code is compiled in response to a blt function call, the code is immediately executed (88). The result is an efficient transfer of the pattern 62 to a destination bitmap 64 using maximum-sized words as much as possible to reduce the transfer time.

Although the present embodiment uses compiler 59 to produce code in a novel and efficient manner, the code may be produced in other ways, such as by precompiling and storing various templates of the code for use within specific blt functions.

The same method of compiling code is practiced for patterns with a different color depth, i.e., a number of bits per pixel other than 8. The pattern and destination bitmaps may have color depths of 16, 24, 32 or other depths. In all such cases, the code portion within the Middle Step is generated a sufficient number of times to transfer an entire pixel row of the pattern in one pass. For example, for a color depth of 16 bits per pixel, there are 2 bytes per pixel. Each code portion can process 4 bytes, i.e., 2 pixels per instruction. The code portion for this example is thus copied 4 times in the Middle Step code.

Figure 6A:
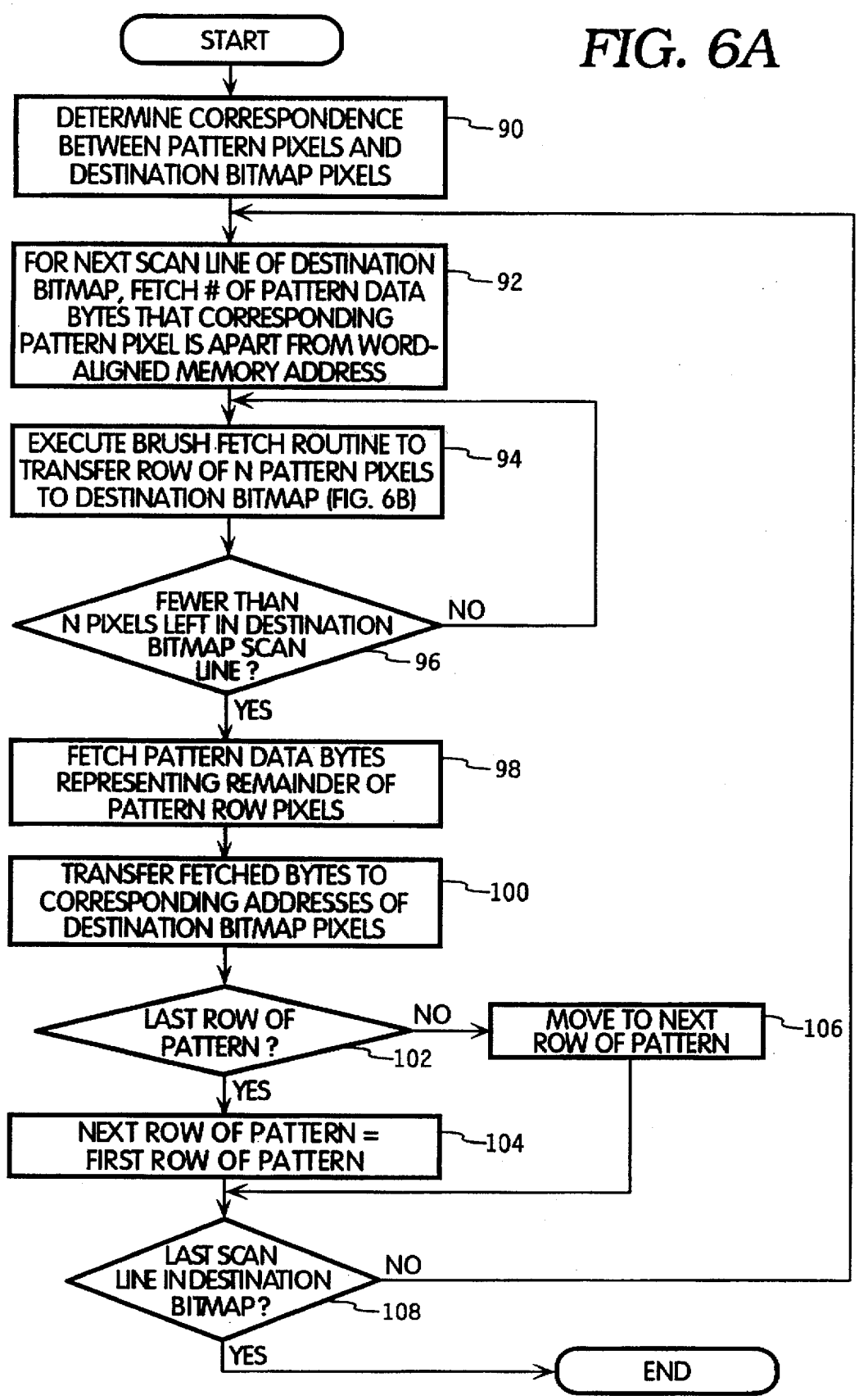
FIGS. 6A, 6B are flowcharts of a method embodying the invention for transferring a brush pattern to a destination bitmap.
Figure 6B:
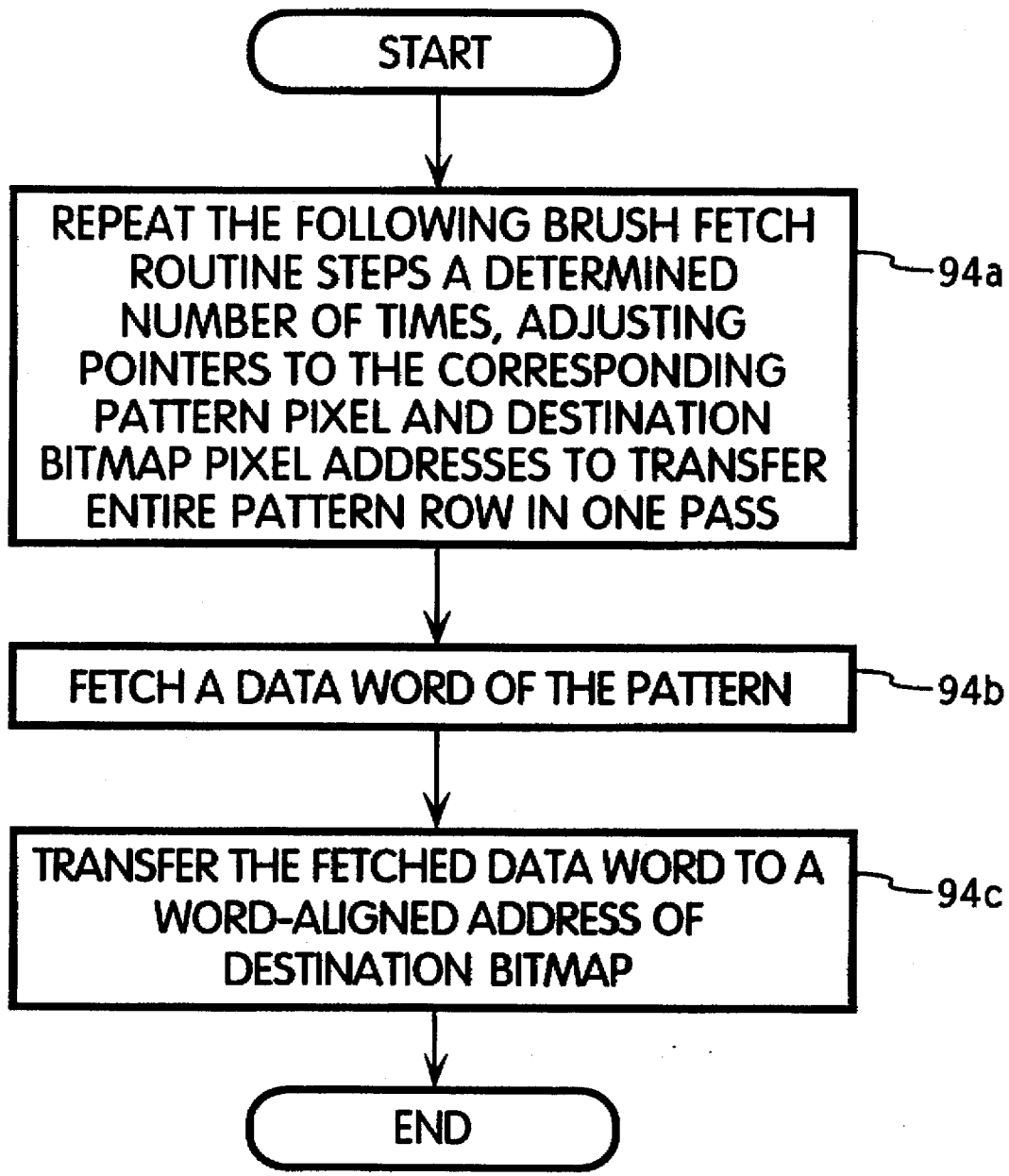

Furthermore, the method of transferring the pattern to the destination bitmap is unique apart from compiler 59. FIGS. 6A and 6B are flowcharts illustrating this method, which in the preferred embodiment is practiced during the execution step 88 of FIG. 4. Initially, the correspondence between the pattern pixels and destination bitmap pixels is established (90). For the next scan line of the destination bitmap (where "next" is initially the first scan line), the pattern bytes that the first corresponding pixel is apart from a word-aligned memory address are fetched (92). Using the example of FIG. 5A, 3 bytes are fetched. The fetched bytes are then transferred to the destination bitmap (94). With the pattern and destination bitmap both now at a word-aligned memory address, the brush fetch routine is executed. It transfers a row of N pixels (such as 8) to the destination bitmap.

The operation of the brush fetch routine is shown in FIG. 6B. The number of times T that steps within the brush fetch routine must be repeated to transfer an entire pixel row in one pass has already been determined, such as by dividing the number of bytes in a pattern row by the number of bytes in a data word. The operands such as EAX, EBX, etc. are set to accommodate the data word, and the pointers to the pattern pixel and destination bitmap addresses are adjusted to transfer the pattern row in one pass (94a). A data word of the pattern is then fetched (94b). The fetched data word is then transferred to a word-aligned address of the destination bitmap (94c). The data word is of sufficient size to occupy the entire word-aligned address. For example, if the word-aligned address is a multiple of 4, then the data word is 4 bytes in length. The steps are repeated sufficiently to combine and transfer an entire row of the pattern in one pass through the brush fetch routine.

Returning to FIG. 6A, the brush fetch routine is repeatedly executed until fewer than N pixels are left in the destination bitmap scan line (96). At this point, the pattern data bytes representing the remainder of the pattern row are fetched (98). These remaining bytes are transferred to corresponding addresses of destination bitmap pixels (100). This completes the combining and transfer of a row of pattern 62 to a scan line 64a of a destination bitmap 64.

Before proceeding to the next scan line, a determination is made of which pattern row is to be combined and transferred to the next scan line. If the just-transferred row is the last row of the pattern (102), then the first row of the pattern becomes the next row (104). If the just-transferred row is not the last row of the pattern, then the following row is the next row (106). The destination bitmap 64 is checked to see if there are further scan lines (108). If so, steps 92–108 are repeated for each subsequent scan line of the destination bitmap until pattern 62 has been transferred to all pixels in the destination bitmap.

Having illustrated and described the principles of the invention in a preferred embodiment, it should be apparent to those skilled in the art that the embodiment can be modified in arrangement and detail without departing from such principles. For example, elements of the preferred embodiment shown in software may be implemented in hardware and vice versa. Steps of the described methods may be taken in other orders. In view of the many possible embodiments to which the principles of our invention may be applied, it should be recognized that the illustrated embodiment is only a preferred example of the invention and should not be taken as a limitation on the scope of the invention. Rather, the scope of the invention is defined by the following claims. We therefore claim as our invention all that comes within the scope and spirit of these claims.

Appendix A
Compiled Code for Example Brush Fetch

Left Step

| | | |
|---|---|---|
| | mov al, gs:[esp+5] | ; fetch first byte of pattern |
| | mov bl, es:[edi] | ; fetch first byte of bitmap |
| | ROP | ; combine pattern byte with bitmap |
| | mov es:[edi], al | ; store combination in dest. bitmap |
| | mov ax, gs:[esp+6] | ; fetch next 2-byte word of pattern |
| | mov bx, es:[edi+1] | ; fetch next 2-byte word of bitmap |
| | ROP | ; combine pattern word with bitmap |
| | mov es:[edi+1], ax | ; store combination in dest. bitmap |
| | add edi, 3 | ; set dest. bmp ptr. to dwrd bndry |

Middle Step

| | | |
|---|---|---|
| | mov ecx, 3 | ; combine row pattern 3 times |
| middle: | mov eax, gs:[exp+0] | ; fetch 4-byte word of pattern |
| | mov ebx, es:[edi] | ; fetch 4-byte word of bitmap |
| | ROP | ; combine pattern word with bitmap |
| | mov es:[edi], eax | ; store combination in dest. bitmap |
| | add edi, 4 | ; increment dest. bitmap pointer |
| | mov eax, gs:[esp+4] | ; fetch next 4-byte word of pattern |
| | mov ebx, es:[edi] | ; fetch next 4-byte word of bitmap |
| | ROP | ; combine pattern word with bitmap |
| | mov es:[edi], eax | ; store combination in dest. bitmap |
| | add edi, 4 | ; increment dest. bitmap pointer |
| | dec ecx | ; another time finished |
| | jnz middle | ; if again, start at beginning of row |

Right Step

| | | |
|---|---|---|
| | mov eax, gs:[esp+0] | ; fetch remaining 4 bytes of pattern |
| | mov ebx, es:[edi] | ; fetch 4 bytes of bitmap |
| | ROP | ; combine pattern bytes with bitmap |
| | mov es:[edi], eax | ; store combination in dest. bitmap |

ROP is a raster operation such as the following:
  xor eax, ebx
The move to the next row of the brush pattern, increment ESP by 8 pixels times the number Z of bytes per pixel (8 * Z). In this example Z is 1:
  add esp, 8    ; increment to next row of pattern
To return to the first scan line of the brush pattern, reset ESP to 0 by ANDing the present value of ESP with a variable mask having a value (8 * Z) − 1. Mask has a value of 63 in this example. ESP is reset only if the next row is the first row:
  add esp 8     ; increment to next row of pattern
  and esp, mask ; next row may be first row

We claim:

1. A method of transferring a pattern of pixels stored in memory to a destination bitmap in memory, comprising:
   (a) determining which pixels of the pattern correspond to pixels of the destination bitmap;
   (b) determining a number of data bytes contained within a pixel row of the pattern; and
   (c) transferring a pixel row of the pattern to the destination bitmap by performing the following steps:
      from memory addresses of corresponding pattern pixels, fetching data bytes from the pattern row a predetermined number of times, the number of times determined by the number of bytes within a pixel row; and
      transferring the fetched data bytes to memory addresses of corresponding destination bitmap pixels.

2. The method of claim 1 wherein the step of transferring the fetched bytes includes:
   combining the fetched data bytes with data bytes from a source bitmap to form combinations; and
   transferring the combinations to memory addresses of corresponding destination bitmap pixels.

3. The method of claim 2 wherein the source bitmap that is combined with the pattern is the destination bitmap.

4. The method of claim 1 wherein the fetching step comprises fetching data bytes in multiple-byte words, and the predetermined number of times multiple-byte words are fetched is determined by the number of multiple-byte words within a pixel row.

5. The method of claim 1 wherein the fetching step comprises fetching data bytes in multiple-byte words on word-aligned memory addresses, and the predetermined number of times is determined by the number of words within a pixel row.

6. The method of claim 5 wherein the multiple-byte words are four bytes in length, and a word-aligned memory address is an address divisible by four.

7. The method of claim 5 wherein the multiple-byte words are two bytes in length, and a word-aligned memory address is an address divisible by two.

8. The method of claim 1 wherein the data bytes in the steps of fetching bytes and transferring bytes comprise multiple-byte words which are fetched from and transferred to word-aligned memory addresses.

9. The method of claim 1 wherein the steps of fetching data bytes and transferring data bytes are repeated to repeatedly transfer a pixel row of the pattern to a destination bitmap scanline, the number of repeated transfers determined by the length of the scanline.

10. The method of claim 1 wherein transferring a pixel row of the pattern to the destination bitmap comprises transferring a pixel row to a scan line of the destination bitmap, the method further including transferring a next pixel row of the pattern to a next scan line of the destination bitmap.

11. The method of claim 10 wherein the pixel pattern has a predetermined number of rows and the next pixel row is a first row of the pattern following a transfer of a last row of the pattern.

12. The method of claim 1 wherein transferring a pixel row of the pattern to the destination bitmap by performing the steps of fetching and transferring is completed in a single pass.

13. A method of transferring a pattern of pixels stored in memory to a destination bitmap in memory, comprising the following steps:
(a) determining which pixels of the pattern correspond to pixels of the destination bitmap, the destination bitmap comprised of scanlines; and
(b) for each scan line of the destination bitmap:
from a corresponding pattern pixel, determining a word-aligned memory address of the pattern;
fetching data words of the pattern from successive word-aligned memory addresses of the pattern a predetermined number of times, the number of times determined by the number of data words within the scanline; and
transferring the fetched data words to successive word-aligned memory addresses of corresponding destination bitmap pixels.

14. The method of claim 13 wherein the step of transferring the fetched data words includes:
combining the data words of the pattern with data words of a bitmap; and
transferring the data word combinations to successive word-aligned memory addresses of corresponding destination bitmap pixels.

15. The method of claim 14 wherein the bitmap that is combined with the pattern is the destination bitmap.

16. The method of claim 13 wherein a data word is four bytes in length, and a word-aligned memory address is an address divisible by four.

17. The method of claim 13 wherein a data word is two bytes in length, and a word-aligned memory address is an address divisible by two.

18. A method of creating code for transferring a pattern of pixels stored in memory to a destination bitmap in memory, comprising:
(a) determining a number of data bytes contained within a pixel row of the pattern; and
(b) compiling computer code that performs the following steps to transfer a pixel row of the pattern to the destination bitmap:
fetching data bytes from the pattern a predetermined number of times, the number of times determined by the number of bytes within a pixel row; and
transferring the fetched data bytes to memory addresses of corresponding destination bitmap pixels.

19. The method of claim 18 wherein the compiling step includes repeatedly transferring a pixel row to a destination bitmap scanline, the number of repeated transfers determined by the length of the scanline.

20. The method of claim 18 wherein the step of transferring the fetched data bytes includes:
combining the fetched data bytes with data bytes from a source bitmap to form combinations; and
transferring the combinations to memory addresses of corresponding destination bitmap pixels.

21. The method of claim 18 wherein the compiled code is configured to transfer a pixel row of the pattern in a single pass through the compiled code.

22. The method of claim 18 wherein the compiling step is performed at run time in response to a call to transfer a pattern to a destination bitmap.

23. Apparatus for transferring a pattern of pixels stored in memory to a destination bitmap in memory, comprising:
(a) means for determining which pixels of the pattern correspond to pixels of the destination bitmap, the bitmap comprised of scanlines; and
(b) means for processing each scan line of the destination bitmap in the following manner:
from a corresponding pattern pixel, determining a word-aligned memory address of the pattern;
fetching data words of the pattern from successive word-aligned memory addresses of the pattern a predetermined number of times, the number of times determined by the number of data words within the scanline;
transferring the fetched data words to successive word-aligned memory addresses of corresponding destination bitmap pixels.

24. The apparatus of claim 23 wherein transferring fetched data words includes:
combining the data words of the pattern with data words of a source bitmap; and
transferring the data word combinations to successive word-aligned memory addresses of corresponding destination bitmap pixels.

25. The apparatus of claim 23 wherein the means for processing is a programmed central processing unit of a computer.

26. The apparatus of claim 23 wherein a word is four bytes in length, and a word-aligned memory address is an address divisible by four.

27. The apparatus of claim 23 wherein a word is two bytes in length, and a word-aligned memory address is an address divisible by two.

28. Apparatus for transferring a pattern of pixels stored in memory to a destination bitmap in memory, comprising:

(a) means for determining which pixels of the pattern correspond to pixels of the destination bitmap;

(b) means for determining a number of data bytes contained within a pixel row of the pattern; and (c) means for transferring a pixel row of the pattern to the destination bitmap by performing the following steps:

from memory addresses of corresponding pattern pixels, fetching data bytes from the pattern a predetermined number of times, the number of times determined by the number of bytes within a pixel row; and transferring the fetched data bytes to memory addresses of corresponding destination bitmap pixels.

29. The apparatus of claim 28 wherein transferring the fetched data bytes includes:

combining the fetched data bytes with data bytes from a source bitmap to form combinations; and transferring the combinations to memory addresses of corresponding destination bitmap pixels.

30. The apparatus of claim 28 wherein the means for transferring is configured to fetch data bytes in multiple-byte words, and the predetermined number of times data bytes are fetched is determined by the number of multiple-byte words within a pixel row.

31. The apparatus of claim 28 wherein the means for transferring is configured to fetch data bytes in multiple-byte words on word-aligned memory addresses, and the predetermined number of times is determined by the number of words within a pixel row.

32. The apparatus of claim 28 wherein the multiple-byte words are four bytes in length, and a word-aligned memory address is an address divisible by four.

33. The apparatus of claim 28 wherein the multiple-byte words are two bytes in length, and a word-aligned memory address is an address divisible by two.

34. The apparatus of claim 28 wherein the means for transferring a pixel row of the pattern is configured to repeatedly transfer a pixel row to a destination bitmap scanline, the number of repeated transfers determined by the length of the scanline.

35. Apparatus for creating code for transferring a pattern of pixels stored in memory to a destination bitmap in memory, comprising:

(a) means for determining a number of data bytes contained within a pixel row of the pattern; and (b) a compiler for compiling computer code that performs the following steps to transfer a pixel row of the pattern to the destination bitmap:

fetching data bytes from the pattern a predetermined number of times, the number of times determined by the number of bytes within a pixel row; and transferring the fetched data bytes to memory addresses of corresponding destination bitmap pixels.

36. The apparatus of claim 35 wherein transferring the fetched data bytes includes:

combining the fetched data bytes with data bytes from a source bitmap to form combinations; and transferring the combinations to memory addresses of corresponding destination bitmap pixels.

37. The apparatus of claim 35 wherein the compiled code is configured to transfer a pixel row of the pattern in a single pass through the code.

38. The apparatus of claim 35 wherein the compiler is configured to repeatedly transfer a pixel row to a destination bitmap scanline, the number of repeated transfers determined by the length of the scanline.

* * * * *